(12) United States Patent
Pitsokos et al.

(10) Patent No.: US 10,173,192 B2
(45) Date of Patent: Jan. 8, 2019

(54) QUAD-CENTRIC NOZZLE AND SYSTEM FOR HYDROCAPSULE ENCAPSULATION

(71) Applicant: Hydrocapsule, Inc., Jasper, GA (US)

(72) Inventors: Michael Pitsokos, Jasper, GA (US); Ara Manukian, Gainesville, FL (US); William Toreki, Gainesville, FL (US)

( * ) Notice: Subject to any disclaimer, the term of this patent is extended or adjusted under 35 U.S.C. 154(b) by 0 days.

(21) Appl. No.: 15/619,541

(22) Filed: Jun. 12, 2017

(65) Prior Publication Data
US 2017/0274343 A1    Sep. 28, 2017

Related U.S. Application Data

(63) Continuation of application No. 13/409,089, filed on Feb. 29, 2012, now Pat. No. 9,675,952.

(51) Int. Cl.
*B28B 1/54*    (2006.01)
*B01J 13/14*   (2006.01)

(52) U.S. Cl.
CPC ......... *B01J 13/14* (2013.01); *Y10T 428/2985* (2015.01)

(58) Field of Classification Search
CPC .......................... B01J 13/14; Y10T 428/2985
See application file for complete search history.

(56) References Cited

U.S. PATENT DOCUMENTS

| 6,780,507 B2 | 8/2004 | Toreki et al. |
| 2002/0050659 A1* | 5/2002 | Toreki ............... A01N 25/006 264/4.1 |

* cited by examiner

*Primary Examiner* — Irina S Zemel
(74) *Attorney, Agent, or Firm* — Crose Law LLC; Bradley D. Crose

(57) ABSTRACT

A quad-centric nozzle and system for hydrocapsule encapsulation is disclosed. In at least one embodiment, a quad-centric nozzle is disclosed for encapsulating discrete droplets of liquid by generating a continuous coating or layer of a polymerizable liquid which is substantially immiscible with the core liquid. In at least one embodiment, the quad-centric nozzle includes: a material feed port assembly, a polymer feed port assembly, a first water feed port assembly, a second water feed port assembly and an encapsulated material exit port assembly. In at least one embodiment, the quad-centric nozzle is configured for use in a system for hydrocapsule encapsulation having a pressure control system, a water control system and sparging column, and an ultraviolet exposure chamber system.

12 Claims, 11 Drawing Sheets

QUAD-CENTRIC NOZZLE AND SYSTEM FOR HYDROCAPSULE ENCAPSULATION

CROSS-REFERENCE TO RELATED APPLICATION(S)

The present non-provisional patent application is a continuation application claiming the benefit of U.S. patent application Ser. No. 13/409,089, entitled "A QUAD-CENTRIC NOZZLE AND SYSTEM FOR HYDROCAPSULE ENCAPSULATION", which was filed on Feb. 12, 2012, which is incorporated herein by reference in its entirety.

FIELD OF THE INVENTION

The technology described herein relates generally to encapsulation systems and methods. More specifically, this technology relates to a quad-centric nozzle and system for hydrocapsule encapsulation. Furthermore, this technology relates to a quad-centric nozzle and system for encapsulating discrete droplets of liquid, or the like, by generating a continuous coating or layer of a polymerizable liquid which is substantially immiscible with the core liquid.

BACKGROUND OF THE INVENTION

Encapsulation is a process by which a solid, liquid, or gas (an input material) is surrounded by a shell, membrane, or the like to ultimately form an output capsule that protects or shields the input material for a predetermined time period, as needed or determined by a specific application. By way of example, a hydrocapsule includes a small sphere having a protective wall or coating around it. The material within the hydrocapsule wall is a core material.

In one aspect, encapsulation refers to processes whereby an active ingredient is placed into a stabilized form in order to allow it to be conveniently stored, or protected from unfavorable conditions, until needed. The active ingredient may be dispersed in a protective matrix, or it may be surrounded by a coating, a shell, or a membrane. The release of active ingredient from the protected form may be rapid (such as by crushing, or by ingestion), or gradual (such as by dissolution, diffusion, or bio-degradation). In this manner it is possible to maximize the effectiveness of the active ingredient by ensuring that it is released at the proper time. This controlled release also can be made to occur over a programmed time interval (sustained release), or on demand (stimulated release).

Related patents known in the art include the following:

U.S. Pat. No. 6,780,507 issued to Toreki et al. on Aug. 24, 2004, and owned by Applicant/Applicant's Assignee, discloses hydrocapsules and associated methods of preparation. This patent is hereby incorporated by reference.

The foregoing patent and other information reflect the state of the art of which the inventor is aware and are tendered with a view toward discharging the inventors' acknowledged duty of candor in disclosing information that may be pertinent to the patentability of the technology described herein. It is respectfully stipulated, however, that the foregoing patent and other information do not teach or render obvious, singly or when considered in combination, the inventors' claimed invention.

BRIEF SUMMARY OF THE INVENTION

In various exemplary embodiments, the technology described herein provides a quad-centric nozzle and system for encapsulating discrete droplets of liquid by generating a continuous coating or layer of a polymerizable liquid which is substantially immiscible with the core liquid.

In one exemplary embodiment, the technology described herein provides a quad-centric nozzle assembly for hydrocapsule encapsulation. The quad-centric nozzle assembly for hydrocapsule encapsulation includes: a material feed port assembly configured for input of a material to be encapsulated; a polymer feed port assembly configured for input of a polymer or other material as a coating material; a first water feed port assembly; a second water feed port assembly; and an encapsulated material exit port assembly. The material feed port assembly, the polymer feed port assembly, the first water feed port assembly, the second water feed port, and the encapsulated material exit port assembly are fluidly coupled to form a quad-centric nozzle for hydrocapsule encapsulation.

In at least one embodiment of the quad-centric nozzle assembly for hydrocapsule encapsulation, the quad-centric nozzle assembly is configured to encapsulate discrete droplets of liquid by generating a continuous coating or layer of a polymerizable liquid which is substantially immiscible with the core liquid.

In at least one embodiment of the quad-centric nozzle assembly for hydrocapsule encapsulation, the material feed port assembly is configured to receive, as an input, a material to be encapsulated by a coating material input through the polymer feed port assembly.

In at least one embodiment of the quad-centric nozzle assembly for hydrocapsule encapsulation, the material feed port assembly further includes, in order and direction of input fluid flow: a compression fitting; a tubing coupled to the compression fitting; a compression nut coupled to the tubing; a compression union coupled to the compression nut; a hollow, threaded rod coupled to the compression unit; a fitting coupled to the rod; and a needle coupled to the fitting.

In at least one embodiment of the quad-centric nozzle assembly for hydrocapsule encapsulation, the polymer feed port assembly is configured to receive, as an input, a coating material to encapsulate a material to be encapsulated entered through the material feed port assembly, and thereby form a dual material stream.

In at least one embodiment of the quad-centric nozzle assembly for hydrocapsule encapsulation, the polymer feed port assembly further comprises, in order and direction of input fluid flow: a compression fitting; a tee coupled to the compression fitting; a nipple coupled to the tee; a fitting coupled to the nipple; and a needle coupled to the fitting.

In at least one embodiment of the quad-centric nozzle assembly for hydrocapsule encapsulation, the first water feed port assembly and the second water feed port assembly each is configured to receive, as an input, water from a water control system.

In at least one embodiment of the quad-centric nozzle assembly for hydrocapsule encapsulation, the first water feed port assembly and the second water feed port assembly each is configured to break up the dual material stream into hydrocapsules as discrete droplets.

In at least one embodiment of the quad-centric nozzle assembly for hydrocapsule encapsulation, the first water feed port assembly and the second water feed port assembly each further comprises: a compression fitting; a tee coupled to the compression fitting; and a pipe hose connection coupled to the tee.

In at least one embodiment of the quad-centric nozzle assembly for hydrocapsule encapsulation, the encapsulated material exit port assembly is configured to drop a plurality of hydrocapsules as discrete droplets, created from a dual material stream formed by the material feed port assembly and the polymer feed port assembly, into a glass, water-jacketed column for exposure to an ultraviolet light source.

In another exemplary embodiment, the technology described herein provides a system for hydrocapsule encapsulation utilizing a quad-centric nozzle. The system for hydrocapsule encapsulation utilizing a quad-centric nozzle includes: a quad-centric nozzle having a material feed port assembly configured for input of a material to be encapsulated, a polymer feed port assembly configured for input of a polymer or other material as a coating material, a first water feed port assembly, a second water feed port assembly, and an encapsulated material exit port assembly, wherein the material feed port assembly, the polymer feed port assembly, the first water feed port assembly, the second water feed port assembly, and the encapsulated material exit port assembly are fluidly coupled to form a quad-centric nozzle for hydrocapsule encapsulation; and a pressure control system configured to regulate a first input of a material to be encapsulated and a second input of a coating material input through the polymer feed port assembly.

The system for hydrocapsule encapsulation utilizing a quad-centric nozzle also includes, in at least one embodiment, a water control system configured to regulate a water input into the first water feed port assembly and the second water feed port assembly.

The system for hydrocapsule encapsulation utilizing a quad-centric nozzle further includes, in at least one embodiment, a water control system configured to regulate a first water input into the first water feed port assembly, a second water input into second water feed port assembly, a third water input into a sparging column, and a fourth water input to provide a chilled water into a column used for exposure of a plurality of hydrocapsules as discrete droplets to an ultraviolet light source. The column is glass, water-jacketed in at least one embodiment.

The system for hydrocapsule encapsulation utilizing a quad-centric nozzle also includes, in at least one embodiment, a sparging column configured to bubble an input inert gas and to provide an output of a sparged, deoxygenated water for input at the first water feed port assembly and at the second water feed port assembly.

The system for hydrocapsule encapsulation utilizing a quad-centric nozzle further includes, in at least one embodiment, a first flow regulator disposed between the sparging column output and the first water feed port assembly; and a second flow regulator disposed between the sparging column output and the second water feed port assembly.

The system for hydrocapsule encapsulation utilizing a quad-centric nozzle also includes, in at least one embodiment, an ultraviolet light source disposed within a UV exposure chamber and configured to expose to ultraviolet light a plurality of hydrocapsules as discrete droplets, created from a dual material stream formed by the material feed port assembly and the polymer feed port assembly through the encapsulated material exit port assembly as the hydrocapsules pass through to a catch basin.

In yet another exemplary embodiment, the technology described herein provides a method for encapsulating discrete droplets of liquid by generating a continuous coating or layer of a polymerizable liquid which is substantially immiscible with the core liquid. The method includes: utilizing a quad-centric nozzle having a material feed port assembly configured for input of a material to be encapsulated, a polymer feed port assembly configured for input of a polymer or other material as a coating material, a first water feed port assembly, a second water feed port assembly, and an encapsulated material exit port assembly, wherein the material feed port assembly, the polymer feed port assembly, the first water feed port assembly, the second water feed port assembly, and the encapsulated material exit port assembly are fluidly coupled to form a quad-centric nozzle for hydrocapsule encapsulation; inputting a material to be encapsulated into the material feed port assembly; inputting a coating material into the polymer feed port assembly; generating a continuous coating or layer of the coating material which is substantially immiscible with the material to be encapsulated; and inputting a first water input to break up the coated material into hydrocapsules as discrete droplets.

The method also includes, in at least one embodiment, inputting a second water input to aid in creation of additional downstream flow.

The method further includes, in at least one embodiment, exposing the hydrocapsules to an energy source.

In still yet another exemplary embodiment, the technology described herein provides a hydrocapsules. The hydrocapsules are produced by the method of: utilizing a quad-centric nozzle having a material feed port assembly, a polymer feed port assembly, a first water feed port assembly, a second water feed port assembly, and an encapsulated material exit port assembly, wherein the material feed port assembly, the polymer feed port assembly, the first water feed port assembly, the second water feed port assembly, and the encapsulated material exit port assembly are fluidly coupled to form a quad-centric nozzle for hydrocapsule encapsulation; inputting a material to be encapsulated into the material feed port assembly; inputting a coating material into the polymer feed port assembly; generating a continuous coating or layer of the coating material which is substantially immiscible with the material to be encapsulated; and inputting a first water input to break up the coated material into hydrocapsules as discrete droplets.

There has thus been outlined, rather broadly, the features of this technology in order that the detailed description that follows may be better understood, and in order that the present contribution to the art may be better appreciated. There are additional features of the technology that will be described and which will form the subject matter of the claims. Additional aspects and advantages of this technology will be apparent from the following detailed description of an exemplary embodiment which is illustrated in the accompanying drawings. The technology described is capable of other embodiments and of being practiced and carried out in various ways. Also, it is to be understood that the phraseology and terminology employed are for the purpose of description and should not be regarded as limiting.

BRIEF DESCRIPTION OF THE DRAWINGS

The technology described herein is illustrated with reference to the various drawings, in which like reference numbers denote like device components and/or method steps, respectively, and in which.

DETAILED DESCRIPTION OF THE INVENTION

Figure 1:
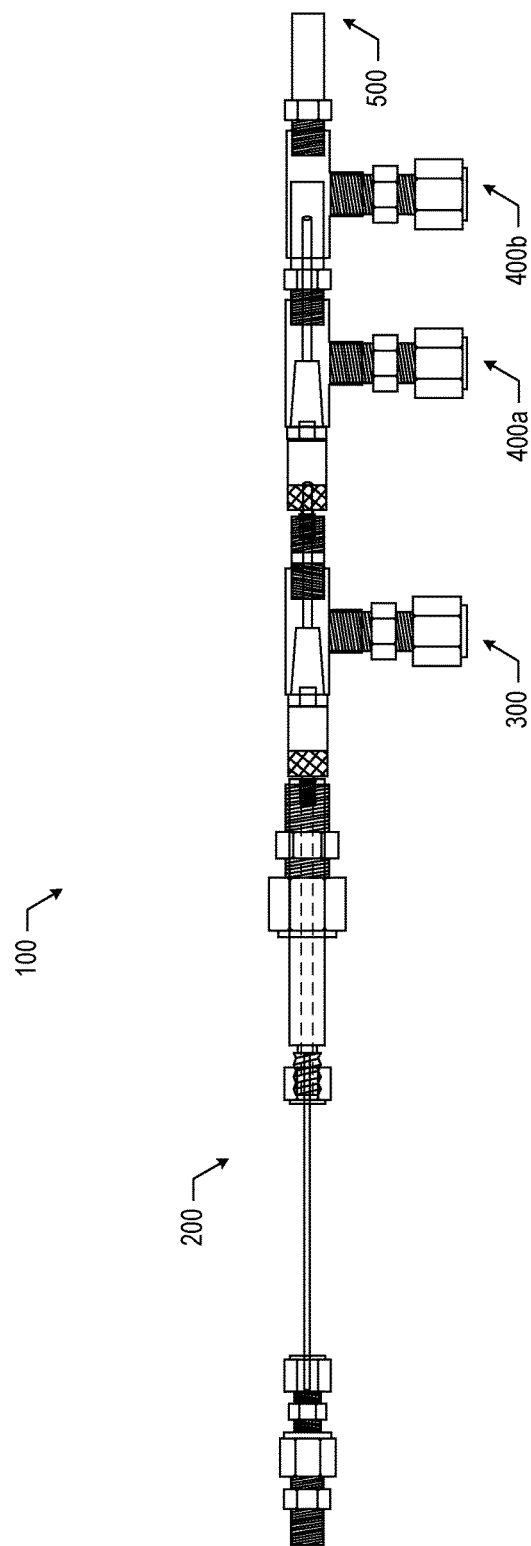
FIG. 1 is a schematic view of a quad-centric nozzle assembly for hydrocapsule encapsulation, illustrating, in particular, a material feed port assembly, a polymer feed port assembly, a first water feed port assembly, a second water feed port assembly and an encapsulated material exit port assembly, according to an embodiment of the invention.

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides a quad-centric nozzle and system for encapsulating discrete droplets of liquid, or the like, by generating a continuous coating or layer of a polymerizable liquid which is substantially immiscible with the core liquid. An encapsulated material defined herein is referred to as a hydrocapsule.

Definitions

A "hydrocapsule" is defined as a discrete capsule(s) or microcapsule(s), of any size, shape, composition, and color, which has a polymeric outer coating (shell or membrane) that surrounds any inner liquid mixture having 10% to 100% water content. The capsules are typically round, but can be any shape, and range in size from 100 microns to 2 centimeters in diameter, and are typically between 2 to 3 millimeters.

A material that is "substantially immiscible" means that the material is generally unable to mix with another material. In the production of hydrocapsules, a continuous coating or layer of a polymerizable liquid is generated which is substantially immiscible with the core liquid which is encapsulated within a polymerized shell.

"Fluidly coupled" means to allow for fluid flow and fluid communication. The term "fluidly coupled" means two or more devices that are connected or attached, either directly or indirectly, to one another, in order to facilitate flow of a liquid or a gas between them.

The term "sparging" means a technique utilizing bubbling a chemically inert gas, like nitrogen, through a liquid. The sparging process is used to remove dissolved gases, such as oxygen.

A "compression fitting" is a device utilized in conduit systems to join two tubes or pipes together. Compression fittings are utilized to provide leak-tight seals in conduit systems with fluid flow.

A "Luer-Lok®" is a standardized system of small-scale fluid fittings used for making leak-free connections between a male-taper fitting and its mating female part on medical and laboratory instruments, including hypodermic syringe tips and needles or stopcocks and needles. Luer-Lok® fittings are securely joined by means of a tabbed hub on the female fitting which screws into threads in a sleeve on the male fitting.

The term "dual material stream" refers to a simultaneous release of two materials in fluid flow through a same fluid path. In the production of hydrocapsules, a dual material stream includes a core material stream and a coating material stream simultaneously released into the same fluid flow path.

The quad-centric nozzle assembly 100 is configured to encapsulate discrete droplets of liquid, or the like, by generating a continuous coating or layer of a polymerizable liquid which is substantially immiscible with the core liquid. The material to be encapsulated may be a liquid, solid, gas, or combination of materials. The output encapsulated material is a hydrocapsule.

Referring now to FIG. 1, a schematic view of a quad-centric nozzle assembly 100 utilized for hydrocapsule encapsulation is shown. The quad-centric nozzle assembly 100 includes a material feed port assembly 200, a polymer feed port assembly 300, a first water feed port assembly 400a, a second water feed port assembly 400b, and an encapsulated material exit port assembly 500.

The material feed port assembly 200, the polymer feed port assembly 300, the first water feed port assembly 400a, the second water feed port assembly 400b, and the encapsulated material exit port assembly 500 are fluidly coupled to form a quad-centric nozzle 100 for hydrocapsule encapsulation. Changes in the alignment of the various components of the quad-centric nozzle 100 will vary the produced hydrocapsule. As such, configurations are varied dependent upon application for hydrocapsule creation, the material to be encapsulated, the strength of the wall or shell encapsulation, and other factors.

The quad-centric nozzle assembly 100 is configured to encapsulate discrete droplets of liquid, or the like, by generating a continuous coating or layer of a polymerizable liquid which is substantially immiscible with the core liquid. The material to be encapsulated may be a liquid, solid, gas, or combination of materials. The output encapsulated material is a hydrocapsule.

In at least one embodiment, the quad-centric nozzle assembly 100 includes interchangeable nozzle tips. As such nozzle tips can be changed dependent upon the specific hydrocapsule application. Additionally, in at least one embodiment, the nozzle tips in any one or more of the nozzle section of the quad-centric nozzle assembly 100 are adjustable, such that flow, size, and other characteristics are variable dependent upon the specific hydrocapsule application.

Nozzles utilized in the quad-centric nozzle assembly 100 can be constructed from a variety of materials, including glass, ceramic, plastic, and metal. Further, the quad-centric nozzle assembly 100 can be constructed from a combination of materials. A glass nozzle provides easy transparency and allow for the visual inspection of the contents and condition of the nozzle. A metal (aluminum, brass, stainless steel, etc.) nozzle, however, is generally more rugged and is easier to fabricate. Additionally, in at least one or more embodiment, one or more elements of the quad-centric nozzle assembly 100 is heated. Various applications in forming hydrocapsules benefit from heating one or more elements of the quad-centric nozzle assembly 100.

Figure 2:
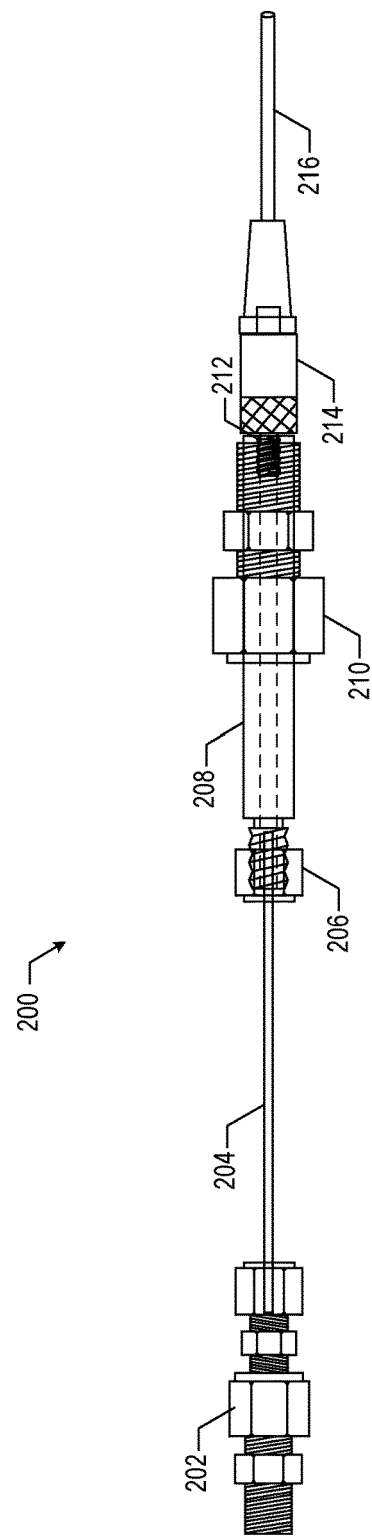
FIG. 2 is a schematic view of a material feed port assembly for a quad-centric nozzle for hydrocapsule encapsulation, according to an embodiment of the invention.
Figure 3:
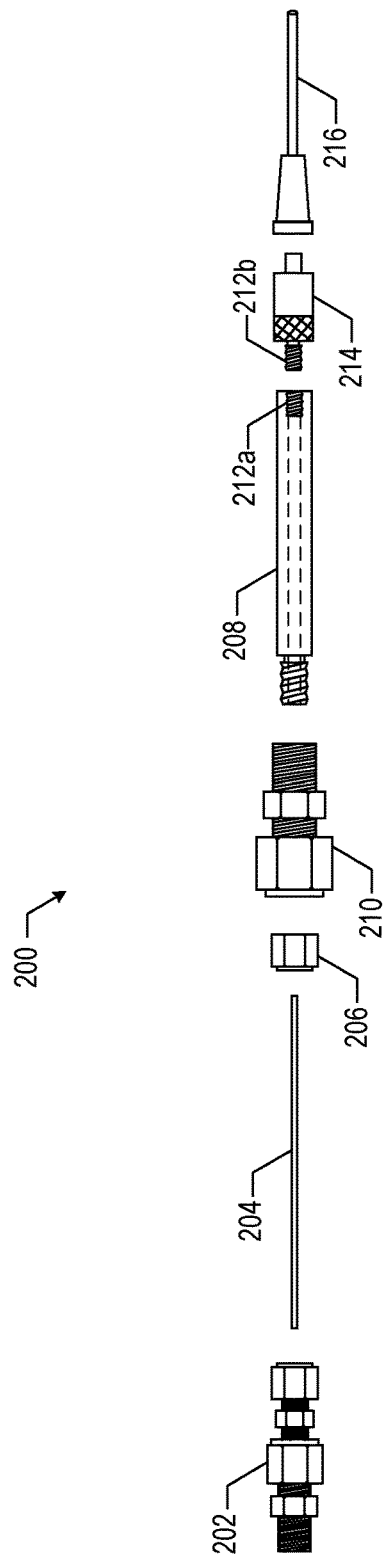
FIG. 3 is an expanded schematic view of the material feed port assembly depicted in FIG. 2.

Referring now to FIGS. 2 and 3, a material feed port assembly 200 for a quad-centric nozzle 100 for hydrocapsule encapsulation is shown. FIG. 2 depicts the material feed port assembly 200 in assembled form. FIG. 3 depicts the material feed port assembly 200 in an expanded view, illustrating each individual element of one embodiment of the material feed port assembly 200.

The material feed port assembly 200 is configured to receive, as an input, a material to be encapsulated by a coating material input through the polymer feed port assembly 300. The material to be encapsulated can be a solid, liquid, gas, or combined material dependent upon the specific hydrocapsule application.

The material feed port assembly 200 includes, in at least one embodiment, and in order and direction of input fluid flow, a compression fitting 202, a tubing 204 coupled to the compression fitting 202, a compression nut 206, coupled to the tubing 204; a compression union 210 coupled to the compression nut 206; a hollow, threaded rod 208 coupled to the compression unit 210; a fitting 214 coupled to the rod 208; and a needle 216 coupled to the fitting 214. The fitting 214 is a Luer-Lok® tapered fitting in at least one embodiment. The tapered fitting 214 is a quick-connect fitting in at least one embodiment. The rod 208 has female thread 212a, and fitting 214 has male thread 212b such that the rod 208 and the fitting 214 are secured fluidly one to another. Testing of the material feed port assembly 200 has determined this to be a means by which a hydrocapsule with the desired properties is produced. The rod 208 is stainless steel in at least one embodiment.

Figure 4:
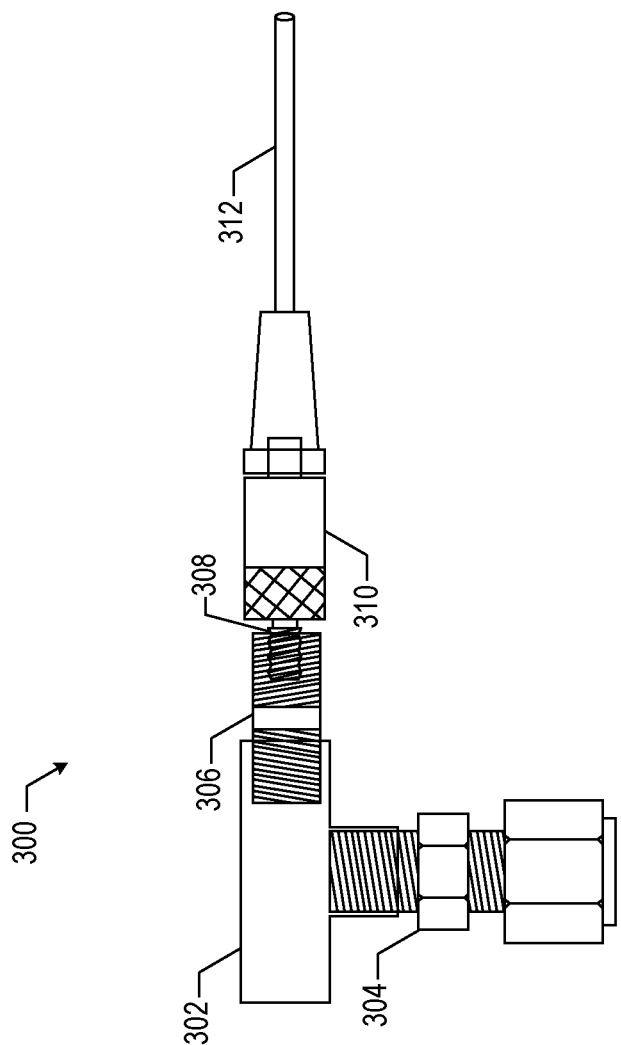
FIG. 4 is a schematic view of a polymer feed port assembly for a quad-centric nozzle for hydrocapsule encapsulation, according to an embodiment of the invention.
Figure 5:
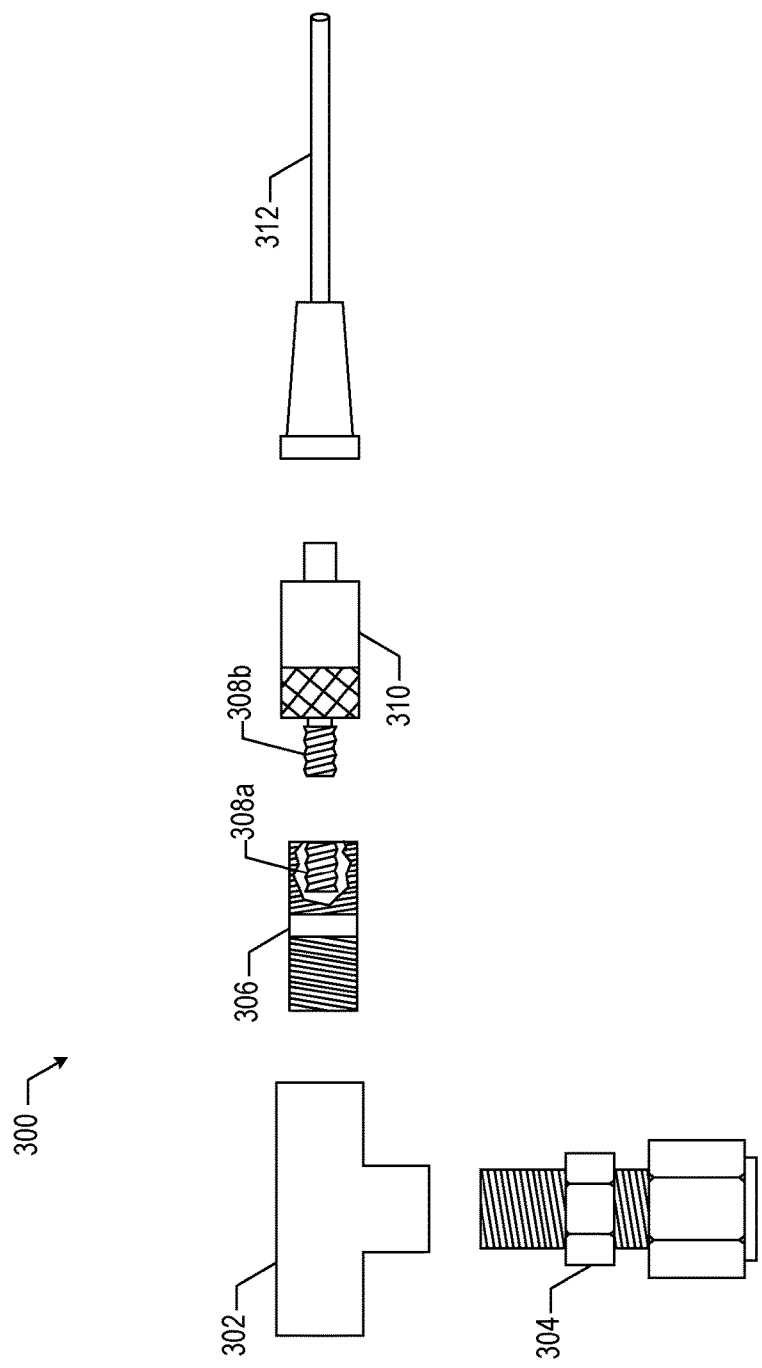
FIG. 5 is an expanded schematic view of the polymer feed port assembly depicted in FIG. 4.

Referring now to FIGS. 4 and 5, a schematic view of a polymer feed port assembly 300 for a quad-centric nozzle 100 for hydrocapsule encapsulation is shown. FIG. 4 depicts the polymer feed port assembly 300 in assembled form. FIG. 5 depicts the polymer feed port assembly 300 in an expanded view, illustrating each individual element of one embodiment of the polymer feed port assembly 300.

The polymer feed port assembly 300 is configured to receive, as an input, a coating material to encapsulate a material to be encapsulated entered through the material feed port assembly 200, and thereby form a dual material stream.

Many of the liquid shell-forming materials which are useful in the practice of this technology can be selected from the broad class of vinyl compounds. These are compounds which contain one or more polymerizable vinyl groups. These vinyl-containing shell-forming materials may be relatively low molecular weight compounds (<200 amu) which are generally referred to as "monomers", or they may be larger molecules (>200 amu) which are generally referred to as "reactive oligomers", "macromonomers", or "prepolymers". Thousands of such compounds are known, and it will be recognized by one skilled in the art that there is a myriad of formulations which can be useful in the practice of this invention. Blends and mixtures in various proportions of all of the types of compounds discussed below can be useful in the practice of this invention. Commonly known acrylate monomers such as methyl methacrylate (MMA), acrylic acid (AA), butyl acrylate (BA), hexyl acrylate (HA), and hydroxyethyl methacrylate (HEMA), are examples of useful low molecular weight monomers. Other less common acrylic monomers like long-chain alkyl acrylates and methacrylates (such as C.sub.12- to C.sub.24-acrylates), tetrahydrofuranyl acrylate, or caprolactone acrylate, for instance, can be used to impart useful properties to the shell formulation. Other commonly known vinyl monomers such as vinyl chloride, styrene, vinyl acetate, or other compounds can also be used in this application. In general, any reactive polymerizable compound which can be incorporated into a liquid formulation may be utilized. Examples of low molecular weight difunctional compounds would include divinyl benzene (DVB), ethylene glycol dimethacrylate (EGDMA), trimethylol triacrylate, and hexane diacrylate. Many other similar compounds are also useful. The use of multifunctional (compounds which contain two or more vinyl units per molecule) will lead to the formation of crosslinked network polymers. Such polymers have desirable properties such as good mechanical strength, elasticity, toughness, and flexibility.

Representative monomers which can be employed according to this technology include but are not limited to acrylic acid, methacrylic acid, methyl acrylate, ethyl acrylate, propyl acrylate, n-butyl acrylate, pentyl acrylate, hexyl acrylate, 2-ethylhexyl acrylate, heptyl acrylate, octyl acrylate, nonyl acrylate, decyl acrylate, dodecyl acrylate, tetradecyl acrylate, hexadecyl acrylate, isopropyl acrylate, isobutyl acrylate, sec-butyl acrylate, 2-methylbutyl acrylate, 3-methylbutyl acrylate, 1-ethylpropyl acrylate, 2-methylpentyl acrylate, 2-ethylbutyl acrylate, 1,3-dimethylbutyl acrylate, 1-methylhexyl acrylate, 2-ethylhexyl acrylate, 1-methylheptyl acrylate, 4-ethyl-1-methyloctyl acrylate, 4-ethyl-1,1-isobutyloctyl acrylate, allyl acrylate, 2-methylallyl acrylate, 1-methylallyl acrylate, 2-butenyl acrylate, 1,3-dimethyl-3-dibutenyl acrylate, 3,7-dimethyl-7-octenyl acrylate, 3,7-dimethyl-2,6-octadienyl acrylate, 3,7-dimethyl-6-octenyl acrylate, tert-butyl acrylate. Representative ester monomers of methacrylic acid which can be used include methyl methacrylate, ethyl methacrylate, n-propyl methacrylate, isopropyl methacrylate, n-butyl methacrylate, isobutyl methacrylate, sec-butyl methacrylate, tert-butyl methacrylate, n-hexyl methacrylate, n-octyl methacrylate, isooctyl methacrylate, decyl methacrylate, n-dodecyl methacrylate, n-tetradecyl methacrylate, n-hexadecyl methacrylate, 2-ethylhexyl methacrylate, allyl methacrylate, oleyl methacrylate, 2-propynyl methacrylate, and the like. The above monomers may be employed separately or in various mixtures according to this invention.

The utilization of reactive prepolymers (which may be monofunctional or multifunctional) allows a wide range of materials properties to be achieved using this invention. In general, reactive prepolymers have higher viscosities than low molecular weight monomers. This property is very useful in that it allows the viscosity of the shell-forming liquid to be controlled. Useful classes of reactive prepolymer materials include polyurethane acrylates, unsaturated polyesters, polyether acrylates, functionalized epoxides, and functionalized silicones (among others). These reactive prepolymers may be monofunctional, or they may be multifunctional.

The polymerization of vinyl-containing compounds is not the only polymerization mechanism which is useful in the practice of this invention. For instance, the ring-opening polymerization of monomers such as ethylene oxide, caprolactone, tetramethyl disiloxane, and similar compounds can also be utilized to form a polymer shell surrounding an aqueous core. Likewise, metathesis polymerization of olefins induced by transition metal catalysts may also be employed for shell formation.

Non-reactive components may also be incorporated into the shell-forming formulations. These types of compounds do not react with the vinyl groups present in the formulation, but instead are added to impart some type of desirable property to either the shell-forming liquid (such as viscosity control) or to the final shell polymer (such as a plasticizing effect). Such compounds may be of any molecular weight. The use of nonreactive polymers in the shell formulation will result in a polymer blend or interpenetrating network after the reactive vinyl components of the formulation have undergone polymerization. Volatile components can also be added in order to facilitate processing, or to modify the properties of the final shell materials. Many types of plasticizers are commonly used in the polymer industry, and can also be used in conjunction with this invention. Examples would include phthalates, adipates, and ureas. Other types of commonly used polymer additives such as chain transfer agents, antioxidants, anti-static compounds, UV stabilizers, dyes, and fillers can also be incorporated into the shell-forming fluids of this invention. Note that it is also possible to incorporate compounds which are not generally liquids at room temperature. A solid polymer dissolved in an appropriate liquid monomer will give a liquid solution which can be used as a shell-forming fluid. Additionally, it is possible to utilize a suspension of solid particulates in a reactive liquid matrix as the shell-forming liquid. These particles will then be incorporated into the shell material. Such particles may be used as fillers to impart desirable characteristics, such as mechanical strength, or controlled density to the cured shell. These filler particles may be metals, microcapsules or microspheres, salts, polymers, ceramics, or organic solids. The use of fillers in polymer formulations is well known in the art. Of course it is necessary that the particle size of the filler particles be small enough to avoid clogging of the various components of the apparatus. This may be accomplished by filtration of the shell-forming fluid prior to use.

The use of silicone-based UV-curable elastomers such as those available from Loctite Corporation as shell-forming components is one example of how particularly useful shell properties can be obtained. Silicone formulations such as these result in biocompatible capsules having favorable mechanical characteristics, environmentally benign properties, and desiccation resistance far superior to hydrogel-based polymers such as alginate or gelatin (>100.times.). Silicone polymers are commonly known to have, by-far, the highest oxygen permeability of any class of synthetic polymer. The oxygen permeability of silicone is 100 times that of polyethylene. This makes it particularly suited for applications such as gas-exchange membranes in heart-lung machines. A myriad of formulations is possible using reactive silicones blended with selected acrylic and urethane resins. Properties such as shell thickness, softness, flexibility, and permeability can be further controlled via the addition of various plasticizers and modifiers, or by adjusting the degree of cross-linking. Hydrophobicity of the membrane plays a key role in determining loss of water from the hydrocapsule. Incorporation of monomers such as octyl acrylate and hydroxyethyl acrylate will cause the shell to become more hydrophobic or hydrophillic, respectively. Films of polymers such as poly(vinyl chloride) or poly (ethylene terephthalate) have very low oxygen permeabilities. Appropriate modification of the shell forming solution also facilitates encapsulation of liquid cores with little or no aqueous content.

The preceding paragraphs illustrate the types of reactive vinyl compounds and additives which can be blended for use as shell-forming materials in the practice of this invention. These types of formulations are well known, and can be used in numerous other traditional polymer processes such as coatings and adhesives. The particular combination of reactants and modifiers selected for a given application will determine the properties of the resulting polymer. The same holds true for utilization of these same formulations in the current invention.

The polymer feed port assembly 300 further comprises, in at least one embodiment, and in order and direction of input fluid flow, a compression fitting 304, a tee 302 coupled to the compression fitting 304, a nipple 306 coupled to the tee 302, a fitting 310 coupled to the nipple 306, and a needle 312 coupled to the fitting 310. The nipple 306 has a female thread 308a, and fitting 310 has a male fitting 308b such that the nipple 306 and the fitting 310 are secured fluidly one to another. The fitting 310 is a Luer-Lok® tapered fitting in at least one embodiment. The fitting 310 is a quick-connect fitting in at least one embodiment. Testing of the polymer feed port assembly 300 has determined this to be a means by which a hydrocapsule with the desired properties is produced.

Figure 6:
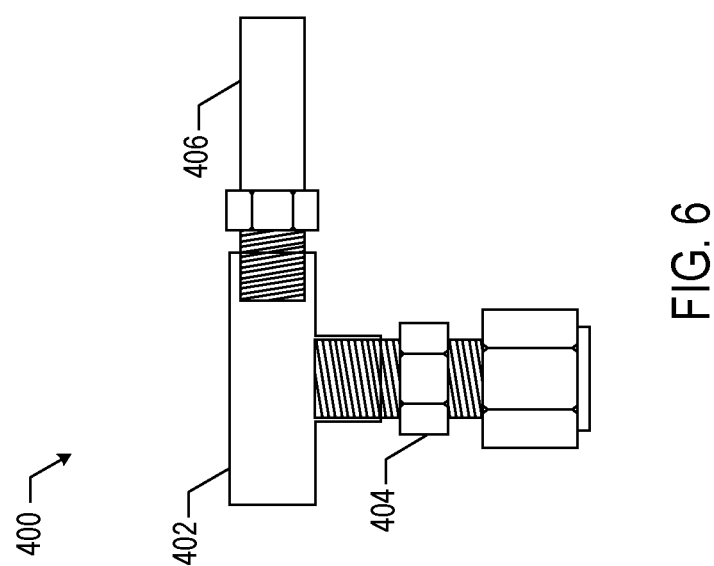
FIG. 6 is a schematic view of a water feed port assembly for a quad-centric nozzle for hydrocapsule encapsulation, according to an embodiment of the invention.
Figure 7:
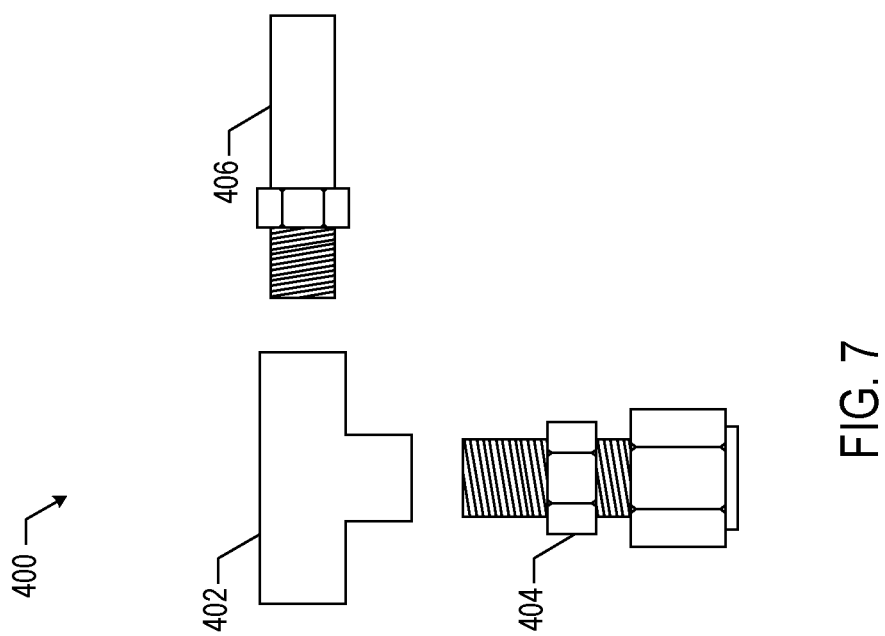
FIG. 7 is an expanded schematic view of the water feed port assembly depicted in FIG. 6.

Referring now to FIGS. 6 and 7, a schematic view of a water feed port assembly 400 for a quad-centric nozzle 100 for hydrocapsule encapsulation is shown. FIG. 6 depicts the water feed port assembly 400 in assembled form. FIG. 7 depicts water feed port assembly 400 in an expanded view, illustrating each individual element of one embodiment of water feed port assembly 400. As depicted in FIG. 1, the quad-centric nozzle 100 for hydrocapsule encapsulation can include more than one water feed port assembly 400, such as 400a and 400b as depicted.

The first water feed port assembly 400a and the second water feed port assembly 400b are each configured to receive, as an input, water from a water control system.

The first water feed port assembly 400a and the second water feed port assembly 400b are each configured to break up the dual material stream into hydrocapsules as discrete droplets. Alternatively, the first water feed port assembly 400a is configured break up the dual material stream into hydrocapsules as discrete droplets, and the second water feed port assembly 400b is configured to add additional water into the system for downward flow.

The first water feed port assembly 400a and the second water feed port assembly 400b each comprise, in at least one embodiment, a compression fitting 404, a tee 402 coupled to the compression fitting 404, and a pipe hose connection 406 coupled to the tee 402. The pipe hose connection 406 is stainless steel in at least one embodiment.

As depicted in FIG. 1, the encapsulated material exit port assembly 500 is configured to drop a plurality of hydrocapsules as discrete droplets, created from a dual material stream formed by the material feed port assembly 200 and the polymer feed port assembly 300.

Figure 8:
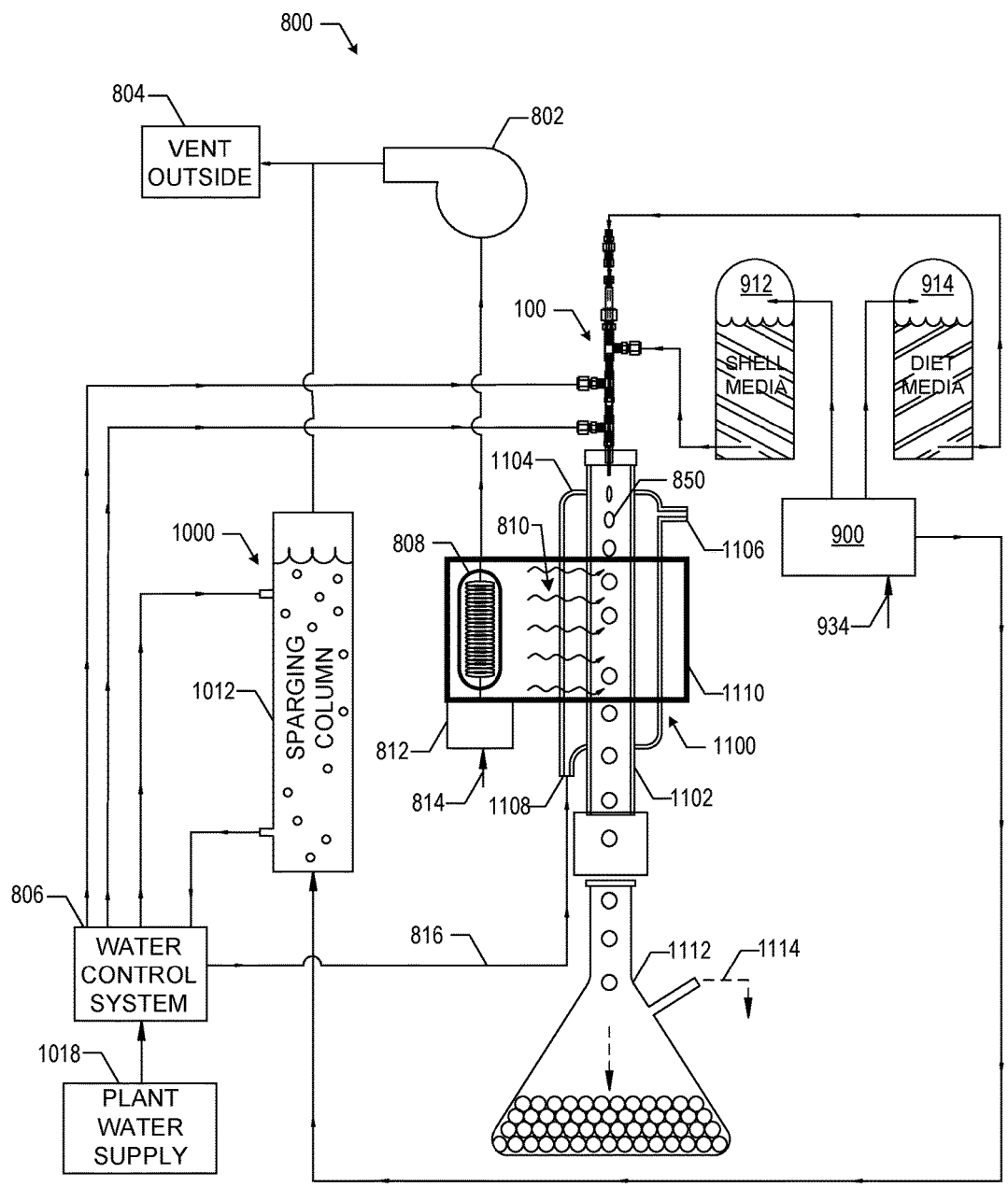
FIG. 8 is a schematic view of a system for hydrocapsule encapsulation, illustrating, in particular, a pressure control system, a water control system and sparging column, and an ultraviolet exposure chamber system, according to an embodiment of the invention.

Referring now to FIG. 8, a schematic view of a system 800 for hydrocapsule encapsulation is shown. The system 800 for hydrocapsule encapsulation includes several sub-component systems.

The system 800 includes a pressure control system 900. The pressure control system 900 is configured to receive an input gas from an inert gas supply 934. In general, the pressure control system 900 is configured to regulate pressure and flow of a first input of a material to be encapsulated (diet media 914) input through the material feed port assembly 200 of nozzle 100. The pressure control system 900 also is configured to regulate pressure and flow of a second input of a coating material (shell media 912) input through the polymer feed port assembly 300 of nozzle 100. The pressure control system 900 further is configured to regulate pressure and flow of a third input to the sparging column assembly 1000. The pressure control system 900 is depicted in greater detail in FIG. 9.

The hydrocapsule system 800 further includes a sparging column assembly 1000. In general, the sparging column assembly 1000, having sparging column 1012, is configured to bubble an inert gas, input from the pressure control system 900 and inert gas supply source 934. The sparging column assembly 1000 also is configured to provide an output of a sparged, deoxygenated water for input at the first water feed port assembly 400a and also at the second water feed port assembly 400b of quad-centric nozzle assembly 100. The sparging column 1012 is vented to an outside vent 804 to provide an exit for the input inert gas. The sparging column assembly 1000 is depicted in greater detail in FIG. 10.

The hydrocapsule system 800 also includes an ultraviolet exposure chamber system 1100. In general, the ultraviolet exposure chamber system 1100 provides an ultraviolet light source (such as UV lamp 808) disposed within a UV exposure chamber 1110. The ultraviolet exposure chamber system 1100 includes UV lamp control 812 and is configured to expose to ultraviolet light (waves 810) the hydrocapsules 850 as discrete droplets. The UV lamp control 812 is powered by electrical supply 814.

Hydrocapsules 850, upon exiting the encapsulated material exit port assembly 500 of quad-centric nozzle assembly 100, enter column 1102. The column 1102 has a glass, water-jacket 1104 for cooling as cooled water 816 enters port 1108, circulates, and exits port 1106. Upon exiting the ultraviolet exposure chamber system 1100 and column 1102, the UV-exposed hydrocapsules a collected in a product catch flask 1112, or the like. Waste water exits through exit port 1114. Ultraviolet heat created by the ultraviolet exposure chamber system 1100 is exhausted by UV heat removal blower 802. The ultraviolet exposure chamber system 1100 is depicted in greater detail in FIG. 11.

The system 800 further includes a water control system 806. The water control system 806 utilizes water from a source, such as plant water supply 1018. The water control system 806 distributes water throughout the system 800 for hydrocapsule encapsulation in various components and for various purposes.

In one aspect the water control system 806 is configured to regulate a water input into the first water feed port assembly 400a of the nozzle assembly 100. The water control system 806 also is configured to regulate a water input into the second water feed port assembly 400b of the nozzle assembly 100.

In another aspect the water control system 806 is configured to provide a third water input a sparging column 1012 of the sparging column assembly 1000. This water entry is utilized in the sparging column 1012 to bubble an inert gas, such as nitrogen, input from the pressure control system 900 and inert gas supply source 934.

In another aspect the water control system 806 is configured to provide a fourth water input into the ultraviolet exposure chamber system 1100 for exposure of a plurality of hydrocapsules 850 as discrete droplets to an ultraviolet light source. The water control system 806 is configured to provide water to the column jacket 1104 through port 1108. In this aspect the water control system 806 includes a chiller, or like device, such that chilled water is delivered to the jacket 1104 through port 1108, circulated through the jacket 1104, and exited through port 1106.

Figure 9:
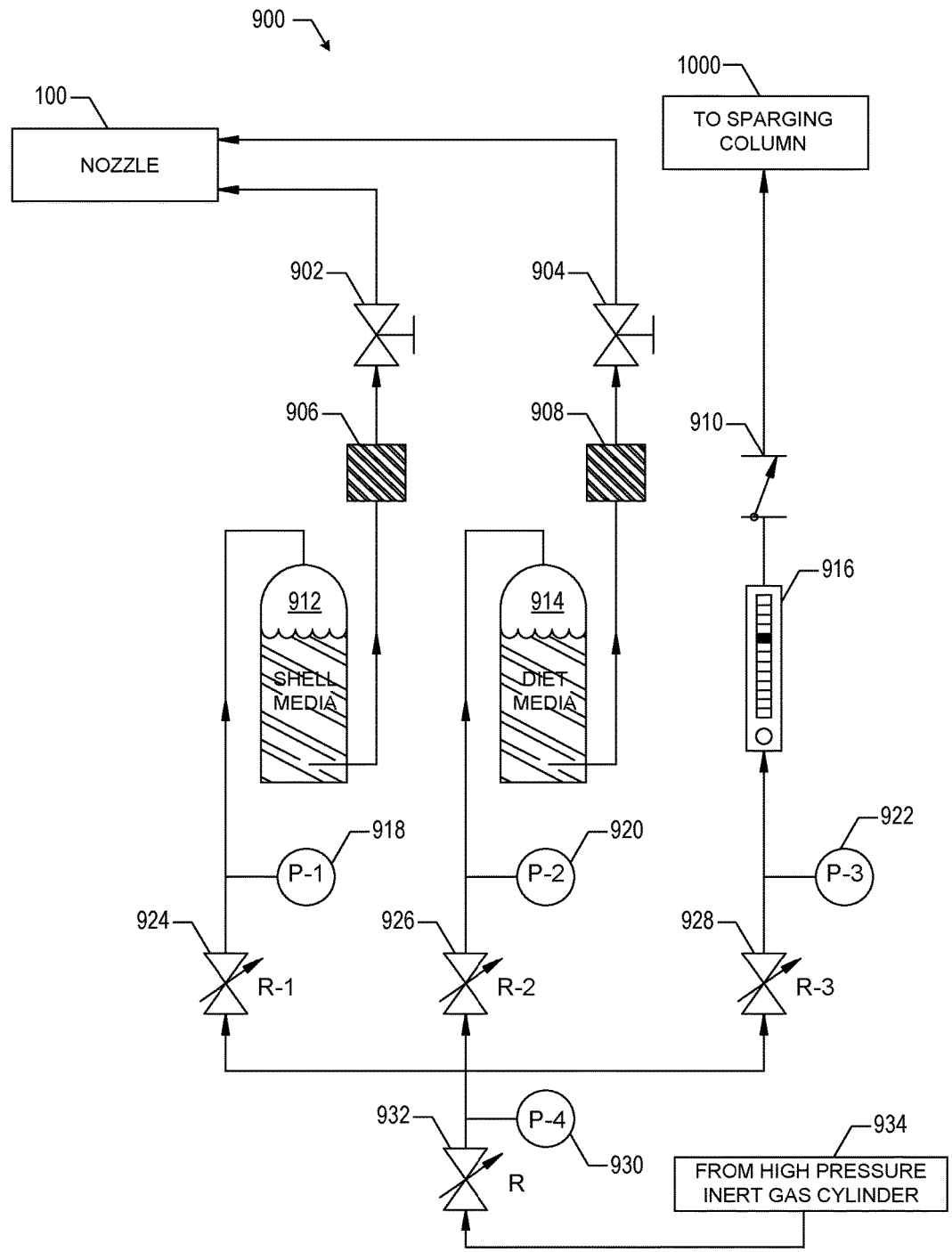
FIG. 9 is an expanded schematic view of a pressure control system used within the system for hydrocapsule encapsulation depicted in FIG. 8.

Referring now to FIG. 9, an expanded schematic view of the pressure control system 900 used within the system 800 for hydrocapsule encapsulation depicted in FIG. 8 is shown. The pressure control system 900 is configured to receive an input gas from an inert gas supply 934. The inert gas supply 934 is a non-reactive gas such as neon or argon. The inert gas supply 934 is selected based upon the specific hydrocapsule application.

The inert gas supply 934 is regulated by an adjustable pressure regulator 932. By way of example the adjustable pressure regulator 932 is a 0-150 PSI first stage adjustable pressure regulator. Additionally the output from adjustable pressure regulator 932 is monitored at pressure gauge 930. By way of example, pressure gauge 930 is a 0-100 PSI pressure gauge.

The pressure control system 900 is configured to regulate pressure and flow of a first input of a material to be encapsulated (diet media 914 reservoir) input through the material feed port assembly 200 of nozzle 100. As depicted in FIG. 9, the pressure in this aspect is regulated by adjustable pressure regulator 926 and monitored by pressure gauge 920. As the pressurized flow exits the diet media reservoir 914, it is passed through a particle filter 908. Media flow is selectively started and stopped with valve 904.

The pressure control system 900 also is configured to regulate pressure and flow of a second input of a coating material (shell media 912 reservoir) input through the polymer feed port assembly 300 of nozzle 100. As depicted in FIG. 9, the pressure in this aspect is regulated by adjustable pressure regulator 924 and monitored by pressure gauge 918. As the pressurized flow exits the shell media reservoir 912, it is passed through a particle filter 906. Media flow is selectively started and stopped with valve 902.

The pressure control system 900 further is configured to regulate pressure and flow of a third input to the sparging column assembly 1000. As depicted in FIG. 9, the pressure in this aspect is regulated by adjustable pressure regulator 928 and monitored by pressure gauge 922. Prior to the sparging column assembly 1000, the flow path includes an adjustable gas flow meter 916. The adjustable flow meter 916 is configured to regulate the flow of the inert gas to enter the sparging column assembly 1000. By way of example, the adjustable flow meter 916 is a 0-500 CCM adjustable gas flow meter. Additionally, between the adjustable flow meter 916 and the sparging column assembly 1000 is placed as check valve 910.

By way of example, adjustable pressure regulators 924, 926, 928 are 0-50 PSI adjustable pressure regulators to provide a second stage of pressure regulation. By way of example, pressure gauges 918, 920, 922 are 0-30 PSI pressure gauges. By way of example, particle filters are 200 UM particle filters. The particle filters can be varied dependent upon the specific hydrocapsule application.

Figure 10:
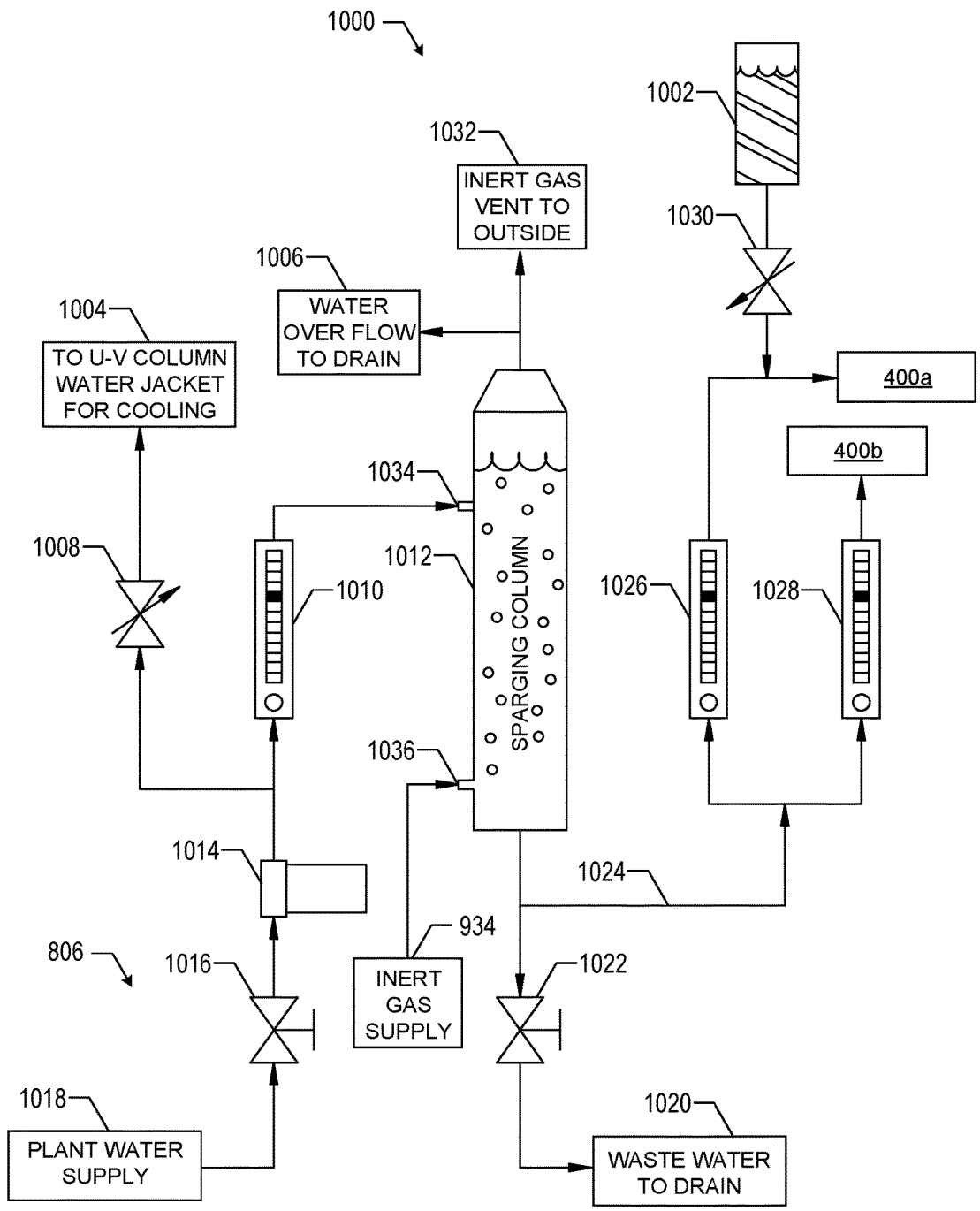
FIG. 10 is an expanded schematic view of a water control system and sparging column used within the system for hydrocapsule encapsulation depicted in FIG. 8.

Referring now to FIG. 10, an expanded schematic view of a water control system 806 and sparging column assembly 1000 used within the system 800 for hydrocapsule encapsulation depicted in FIG. 8 is shown.

The water control system 806 utilizes water from a source, such as plant water supply 1018. The water control system 806 distributes water throughout the system 800 for hydrocapsule encapsulation in various components and for various purposes. The water control system 806 includes a shut-off valve 1016 to regulate, start, and stop the input of the plant water supply 1018.

To further enhance the quality of the output hydrocapsule product and to protect the equipment of the hydrocapsule system 800, a water filter 1014 is used. In at least one embodiment, the water filter 1014 is a carbon/iron water filter. They type of filter utilized is variable.

In one aspect the water control system 806 is configured to regulate a water input into the first water feed port assembly 400a of the nozzle assembly 100. The water control system 806 also is configured to regulate a water input into the second water feed port assembly 400b of the nozzle assembly 100. The output 1024 (which is sparged, deoxygenated water) from the sparging column 1012 of the sparging column assembly 1000 is utilized for the first water feed port assembly 400a and the second water feed port assembly 400b of the nozzle assembly 100.

Between the output 1024 of sparging column 1012 and the first water feed port assembly 400a an adjustable water flow meter 1026 can be used. Likewise, between the output 1024 of sparging column 1012 and the second water feed port assembly 400b an adjustable water flow meter 1028 can be used. By way of example, adjustable water flow meters 1026, 1028 are 0-1500 CFM adjustable water flow meters.

In at least one embodiment in which a surfactant is added, a surfactant reservoir 1002 is utilized. The input of the surfactant is controlled by needle valve 1030. By way of example, the surfactant reservoir 1002 is utilized as a 50/50 surfactant.

In another aspect the water control system 806 is configured to provide a third water input a sparging column 1012 of the sparging column assembly 1000. This water entry is utilized in the sparging column 1012 to bubble an inert gas, input from the pressure control system 900 and inert gas supply source 934 to input port 1036 of the sparging column 1012. The inert gas is vented from the sparging column 1012 to the outside 1032. Water is entered into the sparging column 1012 at input port 1034. Water entered into the sparging column 1012 at input port 1034 is regulated by flow meter 1010. By way of example, flow meter 1010 is a 0-3000 CCM adjustable water flow meter. Water exiting the sparging column 1012 is controlled by drain 1022 to a wastewater output 1020. The sparging column 1012 further includes an overflow drain 1006.

In another aspect the water control system 806 is configured to provide a fourth water input into the ultraviolet exposure chamber system 1100 for exposure of a plurality of hydrocapsules 850 as discrete droplets to an ultraviolet light source. The water control system 806 is configured to provide water to the column jacket 1104 through port 1108. The flow to the column jacket 1104 is controlled by valve 1008. In this aspect the water control system 806 includes a chiller, or like device, such that chilled water is delivered to the jacket 1104 through port 1108, circulated through the jacket 1104, and exited through port 1106.

Figure 11:
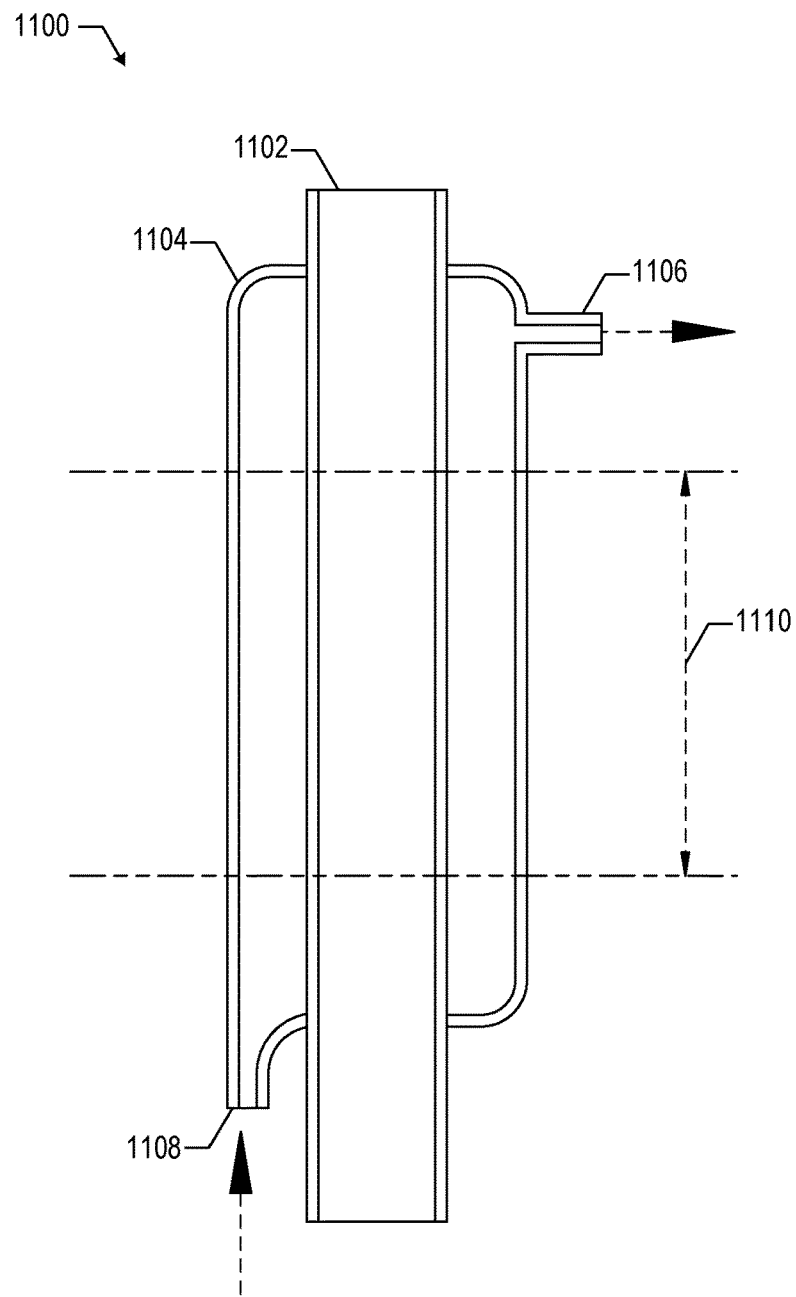
FIG. 11 is an expanded schematic view of an ultraviolet exposure chamber system used within the system for hydrocapsule encapsulation depicted in FIG. 8.

Referring now to FIG. 11, an expanded schematic view of an ultraviolet exposure chamber system 1100 used within the system 800 for hydrocapsule encapsulation depicted in FIG. 8 is shown. By way of example, ultraviolet exposure chamber system 1100 utilizes a GE quartz type 214 fused quartz tubing. UV lamps by Hanovia are also utilized in at least one embodiment. The water control system 806 provides water to the column jacket 1104 of column 1102 through port 1108. The column jacket 1104 and column 1102 are manufactured of glass, specifically quartz glass, in a preferred embodiment. The selection of quartz glass, such as is used in the GE quartz type 214 fused quartz tubing, allows for the ultraviolet light from the ultraviolet exposure chamber system 1100 to penetrate.

Hydrocapsules travel through chilled column 1102 and are exposed to ultraviolet light in the UV zone 1110. The column jacket 1104 includes an exit port 1106 for a cooling water return flow. In this aspect the water control system 806 includes a chiller, or like device, such that chilled water is delivered to the jacket 1104 through port 1108, circulated through the jacket 1104, and exited through port 1106. By way of example, the UV light source can include a Hanovia UV light source.

Having generally described the technology, and the preferred embodiments thereof, the following examples are provided to extend the written description of the technology and to exemplify the embodiments of carrying out this technology. However, it will be appreciated that the scope of this technology should not be considered to be limited to the specifics of the examples, which are provided merely for illustrative purposes. Example 1 demonstrates the use of this technology in the manufacture and production of an artificial salmon egg lure. Example 2 demonstrates the use of this technology in the manufacture and production of hydrocapsules that float.

Example 1

Example 1 demonstrates the use of a quad-centric nozzle and system for hydrocapsule encapsulation for encapsulating discrete droplets of liquid in the manufacture and production of an artificial salmon egg lure.

An artificial salmon egg lure is produced by the following method steps:

1) The pressure control system 90 is actuated. The adjustable pressure regulator 932 to the inert gas supply 934 is opened and staged at 50 psi to provide operating pressure to pressure controllers in the system.
2) One or more blowers 802 are actuated for the removal of ultraviolet heat created by the ultraviolet exposure chamber system 1100. Use of the blowers 802 eliminates heat buildup in the system.
3) The main water source 806 to the system is activated. Water from the water control system 806 is passed through a filtration system. Subsequent to filtration, water fills the sparging column 1000.
4) A separate water source (such as a water chiller in water control system 806) is actuated. The water chiller 806 provides cooling water to the sleeved UV column 1104 through which the Hydrocapsules fall.
5) Polymer is added to the polymer container 912 (shell media). The polymer container 912 is then sealed.
6) The feed material for the salmon egg fill is added to its respective container 914 (diet media) and is sealed as well. The polymer container 912 and the diet media container 914 are then pressurized to 5 psi.
7) Inert gas from the inert gas supply 900 is turned on to enter the sparging column 1000. This process is used to eliminate oxygen from the water within to thereby provide a deoxygenated water source for the quad-centric nozzle assembly 100. Two water flows are actuated and allow water to enter the quad-centric nozzle assembly 100, one for capsule shear, the other for downward water flow. These water flows are set at a rate 250 cubic centimeters per minute.
8) The ultraviolet exposure chamber system 1100 and UV lamp 808 is actuated. The system is ready to start producing capsules.

9) Valve 902 is turned on to the polymer feed allowing solid capsules to form first. The pressure control system 900 also is configured to regulate pressure and flow of the input of a coating material (shell media 912 reservoir) input through the polymer feed port assembly 300 of nozzle 100. The pressure in this aspect is regulated by adjustable pressure regulator 924 and monitored by pressure gauge 918. As the pressurized flow exits the shell media reservoir 912, it is passed through a particle filter 906. Media flow is selectively started and stopped with valve 902.

10) Secondary feed valve 904 is then opened to start filling capsules forming a fluid filled artificial salmon egg. The pressure control system 900 is configured to regulate pressure and flow of the input of a material to be encapsulated (diet media 914 reservoir) input through the material feed port assembly 200 of nozzle 100. The pressure in this aspect is regulated by adjustable pressure regulator 926 and monitored by pressure gauge 920. As the pressurized flow exits the diet media reservoir 914, it is passed through a particle filter 908. Media flow is selectively started and stopped with valve 904.

11) Hydrocapsules in the form of artificial salmon egg lures are produced.

Example 2

Example 2 demonstrates the use of a quad-centric nozzle 100 and system for hydrocapsule encapsulation for encapsulating discrete droplets of liquid in the manufacture and production of hydrocapsules that float. By way of example, hydrocapsules that float are, less dense than water such as oil certain capsules and gas capsules.

Hydrocapsules that float are produced by the following method steps:

1) The quad-centric nozzle assembly 100 is attached to the bottom of the sparging column 1000 via clamps and a rubber fitting to the inside of the quartz column.
2) The pressure control system 90 is actuated. The adjustable pressure regulator 932 to the inert gas supply 934 is opened and staged at 50 psi to provide operating pressure to pressure controllers in the system.
3) One or more blowers 802 are actuated for the removal of ultraviolet heat created by the ultraviolet exposure chamber system 1100. Use of the blowers 802 eliminates heat buildup in the system.
4) The main water source 806 to the system is activated. Water from the water control system 806 is passed through a filtration system. Subsequent to filtration, water fills the sparging column 1000.
5) A separate water source (such as a water chiller in water control system 806) is actuated. The water chiller 806 provides cooling water to the sleeved UV column 1104 through which the Hydrocapsules fall.
6) Polymer is added to the polymer container 912 (shell media). The polymer container 912 is then sealed.
7) The diet media container 914 is filled with either low density fill material or gas depending on application. (This is for capsules that float such as gas capsules, oil capsules or anything that has a density of less than 1.)
8) The sparging column 1000 is filled with water. The inert gas supply 900 is actuated to 250 ccm to sparge oxygen from the water.
9) Valves are closed to the nozzle for feed and polymer.
10) The system is pressurized to 8 psi for both shell media 912 reservoir and diet media container 914.
11) The ultraviolet exposure chamber system 1100 and UV lamp 808 is actuated. The system is ready to start producing hydrocapsules that float.
12) A collection funnel is then set up at the top of the column 1000 with a drain spout allowing the collection of capsules after formation.
13) Valves to the nozzles are turned on for water, fill material, polymer.
14) Capsule formation begins.
15) Capsules float up through the UV column and are polymerized.
16) The finished capsules collect in the funnel for collection as the excess water is drained through a separate orifice in the funnel.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A method for encapsulating discrete droplets of liquid for hydrocapsule encapsulation with a quad-centric nozzle assembly, the method comprising:
utilizing a quad-centric nozzle having a material feed port assembly configured for input of a material to be encapsulated, a polymer feed port assembly configured for input of a polymer or other material as a coating material, a first water feed port assembly, a second water feed port assembly, and an encapsulated material exit port assembly, wherein the material feed port assembly, the polymer feed port assembly, the first water feed port assembly, the second water feed port assembly, and the encapsulated material exit port assembly are fluidly coupled to form a quad-centric nozzle for hydrocapsule encapsulation; inputting the material to be encapsulated into the material feed port assembly;
inputting the coating material into the polymer feed port assembly;
generating a continuous coating or layer of the coating material which is substantially immiscible with the material to be encapsulated; and
inputting a first water input to break up the coated material into hydrocapsules as discrete droplets.

2. The method of claim 1, further comprising:
inputting a second water input to aid in creation of additional downstream flow.

3. The method of claim 1, further comprising:
exposing the hydrocapsules to an energy source.

4. The method of claim 1, wherein the quad-centric nozzle assembly is configured to encapsulate discrete droplets of liquid by generating a continuous coating or layer of a polymerizable liquid which is substantially immiscible with the core liquid.

5. The method of claim 1, wherein the material feed port assembly is configured to receive, as an input, the material to be encapsulated by a coating material input through the polymer feed port assembly.

6. The method of claim 1, wherein the material feed port assembly further comprises, in order and direction of input fluid flow:

a compression fitting;
a tubing coupled to the compression fitting;
a compression nut coupled to the tubing;
a compression union coupled to the compression nut;
a hollow, threaded rod coupled to the compression unit;
a taper fitting coupled to the rod; and
a needle coupled to the taper fitting.

7. The method of claim 1, wherein the polymer feed assembly is configured to receive, as an input, the coating material to encapsulate the material to be encapsulated entered through the material feed port assembly, and thereby form a dual material stream.

8. The method of claim 1, wherein the polymer feed port assembly further comprises, in order and direction of input fluid flow:
a compression fitting;
a tee coupled to the compression fitting;
a nipple coupled to the tee;
a taper fitting coupled to the nipple; and
a needle coupled to the taper fitting.

9. The method of claim 1, wherein the first water feed port assembly and the second water feed port assembly each is configured to receive, as an input, water from a water control system.

10. The method of claim 1, wherein the first water feed port assembly and the second water feed port assembly each is configured to break up the dual material stream into hydrocapsules as discrete droplets.

11. The method of claim 1, wherein the first water feed port assembly and the second water feed port assembly each further comprises:
a compression fitting;
a tee coupled to the compression fitting; and
a pipe hose connection coupled to the tee.

12. The method of claim 1, wherein the encapsulated material exit port assembly is configured to drop a plurality of hydrocapsules as discrete droplets, created from a dual material stream formed by the material feed port assembly and the polymer feed port assembly, into a column for exposure to an energy source.

* * * * *